United States Patent [19]
Annett et al.

[11] 3,822,092
[45] July 2, 1974

[54] PHOTOGRAPHIC TRANSPARENCY SUPPORT WITH ROTATABLE SOUND TRACK CARRIER

[75] Inventors: Leland W. Annett, Crystal; George J. Wallin, St. Paul, both of Minn.

[73] Assignee: Minnesota Mining & Manufacturing Company, St. Paul, Minn.

[22] Filed: Mar. 30, 1972

[21] Appl. No.: 239,461

[52] U.S. Cl. ............................................. 353/120
[51] Int. Cl. ..................... G03b 21/00, G03b 23/08
[58] Field of Search ................. 353/19, 120; 274/46

[56] References Cited
UNITED STATES PATENTS

| | | | |
|---|---|---|---|
| 3,159,078 | 12/1964 | Schwartz | 353/19 |
| 3,296,925 | 1/1967 | Yamamoto | 353/19 |
| 3,463,303 | 8/1969 | Gorman | 274/42 |
| 3,504,967 | 4/1970 | Hipp | 353/19 |

Primary Examiner—Louis R. Prince
Assistant Examiner—A. Jason Mirabito
Attorney, Agent, or Firm—Alexander, Sell, Steldt and Delahunt

[57] ABSTRACT

A frame for a transparency and a rotatable sound track. The front face of the frame is formed with an annular cavity for rotatably supporting an annular sheet of material having a magnetizable coating and an embossed area forming a spiral sound track on the front face. The annular sheet is supported on a circular wall surrounding an opening through the frame, and the rear face of the frame is provided with a support for positioning a transparency over the opening.

4 Claims, 5 Drawing Figures

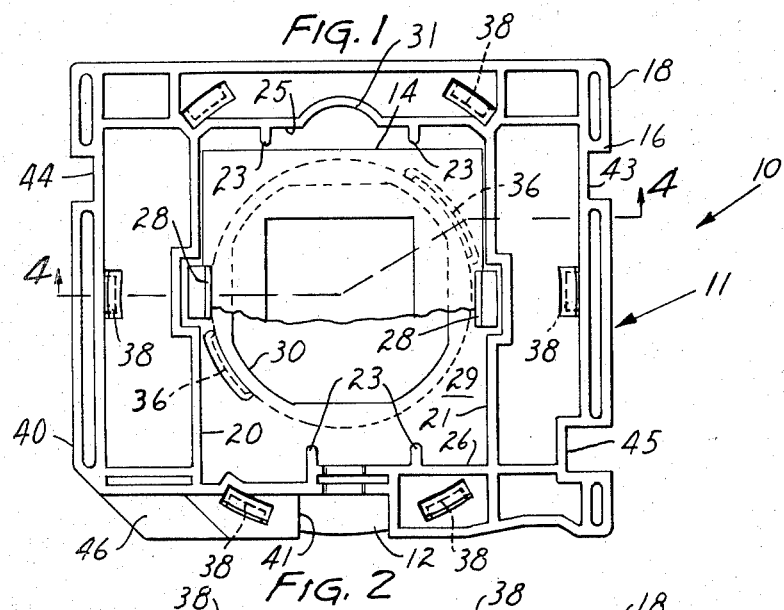

PHOTOGRAPHIC TRANSPARENCY SUPPORT WITH ROTATABLE SOUND TRACK CARRIER

BACKGROUND OF THE INVENTION

1. Field of the Invention.

This invention relates to improvements in holders for slides, and in one aspect, to an improved holder for slides where the holder is provided with a sound track enabling the production of sound concurrently with the projection of a slide in a projector.

2. Description of the Prior Art.

Projectors which afford the recording and reproducing of sound in relation to a specific image projected from a slide or transparency are well known in the prior art. There are a number of patents in the prior art which disclose a support structure in which a transparency is supported by a frame and the frame has a stationary sound track supported by the frame in a position surrounding the transparency or the opening through the holder over which the transparency is supported. Examples of these patents include U.S. Pat. Nos. 3,240,117; 3,282,154 and 3,504,967. In each of these devices the sound track is formed by a thin sheet of magnetic recording material and is either glued or clamped onto the support and preferably over a resilient sheet such as a foam or sponge-like material, permitting the magnetic recording head to have good contact with the magnetic coating on the sheet. It has become apparent however from experience with this sort of equipment that to drive the magnetic head in a spiral path about the optic axis of the projector requires considerable parts all of which requires special alignment.

Projectors which afford the combination of sound plus the projection of the transparency which utilize a movable sound track are also known in the prior art. Examples of these devices are shown in U.S. Pat. Nos. 2,961,922; 3,296,925; and 3,270,614. In each instance of the prior art patents however the drive afforded for the rotating sound carrier has been by the use of edge drive rollers contacting the outer peripheral edge of the carrier or a pair of pressure rollers contacting the surface of the carrier in some area radially inward of the periphery as is illustrated in FIG. 33 of Pat. No. 3,296,925, and in U.S. Pat. No. 3,245,312, a companion to the aforementioned U.S. Pat. No. 3,270,614. In each of these constructions it is necessary that the support for the sound track or the magnetic material be specifically constructed with a rigid backing, i.e., about as rigid at least as a 6 mil polymeric film, such that the drive wheels, pressing against the outer peripheral edge, or the rollers contacting the carrier when their axis are parallel, do not cause the magnetic carrier to become wrinkled or distorted during operation. Coating such rigid films or laminating a magnetic oxide coated tape to a rigid backing causes an increase in cost of a structure such as is shown in the prior art patents mentioned hereinabove.

The assembly of the present invention utilizes a composite film having a heat resistant base layer, a heat softenable intermediate layer and a conformable upper layer of magnetic powder oxide in a nonmagnetic binder. This structure, allowing a 2 mil thickness for the intermediate layer and 0.9 mil thickness for the magnetic layer results in a total thickness of preferably not over 7 mils.

The tremendous advantage of being able to record the voice of a child while the picture is being taken and then to transpose the picture into a finished slide and the voice recording to a sound track accompanying the slide is possible. The construction of this invention makes this feasible. It also makes it feasible for use in the dissemination of informational, instructional or educational material to schools, factories, salesmen, public display booths etc. as cost is not prohibitive.

It is thus an object of the present invention to provide a combined slide and sound track supporting frame assembly which will be functional, durable, and yet sufficiently inexpensive that its broad application is possible.

SUMMARY OF THE INVENTION

The sound track and transparency supporting assembly of the present invention comprises a generally rectangular frame having a front and rear face and edge walls. The edge walls are formed with recesses affording operation of the assembly by a slide changing mechanism and for permitting a drive assembly to contact the sound track supporting material. The front face of the frame has an annular cavity in which is retained, by radially projecting tabs and tongues, an annular sheet of material having on one face a magnetizable coating and an embossed spiral sound track. The frame is also formed with an opening through its center large enough to permit the passage of light to project a 35mm or 126mm slide. The rear face of the frame is provided with wall members for positioning and supporting a transparency over the opening through the center of the frame.

The annular cavity is defined on the front face by an inner wall which surrounds the opening and has a cylindrical surface having a radius which is slightly smaller than an opening through the center of the annular disc or section of magnetic material to rotatably support the same and an outer circular wall concentric with said inner wall. The tabs are formed on the outer wall and project radially inward above the bottom surface of the frame cavity to mechanically retain the annular sheet of material in the cavity. A pair of tongues are formed on the inner wall and project radially outward therefrom over the cavity to also aid in retaining the annular piece of magnetic material on the frame.

BRIEF DESCRIPTION OF THE DRAWING

The present invention will be more fully understood after reading the following detailed description which refers to the accompanying drawing wherein:

FIG. 1 is an elevational view of the rear face of the sound-slide support assembly of the present invention;

FIG. 2 is an elevational view of the front of the sound track supporting member;

FIG. 3 is a bottom elevational view of the supporting assembly;

FIG. 4 is an enlarged cross sectional view taken generally along the line 4—4 of FIG. 1; and FIG. 5 is an enlarged detail view of the sound slide assembly illustrating the relationship between the drive capstan, the pressure roller and the magnetic material in the assembly.

DESCRIPTION OF THE PREFERRED EMBODIMENT

The sound track and transparency supporting assembly of the present invention, hereinafter referred to as the sound-slide assembly and generally designated by the reference numeral 10, comprises a frame 11, an annular section of magnetic material 12 and a transparency or slide or photographic transparency 14.

The monolithic frame 11 has a front face 15 and a rear face 16. On the rear face (FIG. 1) there is formed a plurality of recessed areas within the perimeter of an edge 18 which serve to lighten the frame. Centrally disposed on the rear face and defined by parallel walls 20 and 21 is a pocket or cavity sized to receive a slide 14. The slide 14, including generally a cardboard frame and a chip of developed transparent photographic film, is positioned between the walls 20 and 21 and is located by opposed projections 23 extending into the area between the walls 20 and 21 from other walls 25 and 26. A pair of opposed fingers 28 (see FIGS. 1, 2 and 4), molded with the frame and protruding rearwardly and over the surface 29 of the frame 11 will hold the slide against the surface 29 and between the walls 20 and 21. The surface 29 is formed with an irregular opening 30 which extends through the frame 11 and has an area exceeding the area of a slide film section.

The wall 25 is also formed with a concave section 31 adjacent the support area for the slide to permit a thumb or finger to lift the end of a slide 14 above the projections 23 to remove it from beneath the fingers 28.

The front face 15 of the frame 11 is formed with an annular recess or cavity defined by an inner continuous cylindrical wall 32, an outer substantially continuous concentric cylindrical wall 33 and the surface 35 therebetween. The wall 32 is concentric with the opening 30 and surrounds the opening. A pair of arcuate tongues 36, positioned in diametrically opposed relationship are formed on the wall 32 and extend radially therefrom over the cavity in positions spaced axially from the surface 35. Tabs 38 are spaced circumferentially around the wall 33 and extend radially inwardly therefrom over the cavity and are axially spaced from the surface 35. The tongues 36 and tabs 38 are spaced from the surface 35 sufficiently to slidably receive therebetween the annular magnetic material 12.

The frame 11 has a substantially continuous edge wall 40, it being interrupted only for a small space along the top edge of the frame as shown in FIG. 2 and at the bottom edge where a recess 41 is formed in the approximate center. The recess 41 exposes opposed faces of the magnetic material 12 to permit contact therewith to rotate the material as will be hereinafter explained. Recesses are also formed in the wall 40 to define a pair of arm receiving recesses 43 to 44 to accommodate a changer mechanism as disclosed in issued U.S. Pat. No. 3,480,356, and a recess 45 to receive a push arm for a changer as disclosed and claimed in the application of Leland W. Annett and George J. Wallin, filed simultaneously with this application (attorney docket No. 27,534) as Ser. No. 239,460, now U.S. Pat. No. 3,732,000.

Along the lower or bottom edge on the rear face of the frame 11 (as shown in FIG. 1 and as shown in FIG. 3) is an inclined surface 46 extending from a truncated corner from the front face 15 toward the rear face 16. This inclined surface serves as a cam to separate a spring biased pressure roller 47 from a capstan 48 which is rotatably mounted on a fixed axis. The surface 46 will urge these members apart upon insertion of the frame 11 laterally therebetween toward an operative position where the opening 30 is aligned with the optic axis in a transparency projector and the recess 41 is disposed at the capstan 48 where the capstan 48 can contact the backing of the magnetic material 12 and the pressure roller 47 can contact the magnetic oxide coated front face. The capstan 48 is a right truncated conical roller with the axis thereof positioned to intersect the center of the magnetic material. The pressure roller 47 is also a truncated cone but has axially spaced sections of different radii to define a portion 50 which contacts the material 12 and a larger portion 51 which will contact the capstan 48 beyond the periphery of the annular material 12. The conical shape of the capstan and pressure roller assure the uniform rotation of the material about the wall 32 without wrinkling, stretching or varying the rotational speed of the material except by changes in the speed of the capstan.

The magnetic material 12 comprises an annular composite film constructed according to the film described and claimed in U.S. Pat. application Ser. No. 163,915, filed July 19, 1971 by Victor R. Franer, and assigned to the assignee of this application. The magnetic material 12 is a composite comprising a flexible heat resistant base layer, a heat softenable pressure formable adherent intermediate layer, and a conformable front layer of a magnetic powder oxide dispersed in a non-magnetic binder. The material can be permanently embossed in its front face upon pressure contact with a suitable heated die to provide thereon a guide pattern such as a spiral rib 53 having a lead-in or start area and a pitch of approximately 0.0176 in over 18 revolutions. The ribs can have a height from the front face of about 0.003 to 0.004 inch and a radial dimension of 0.0034 inches.

The base layer of the material 12 is preferably a film or sheet formed of a mixture of polyethylene terephthalate and polysulfone such as disclosed in U.S. Pat. Application Ser. No. 795,741, filed June 1, 1969.

The intermediate layer is adherent, heat softenable and pressure formable and contains no material having an appreciable magnetic susceptibility. The material comprising the intermediate layer is solid at room temperature, however, when heated it will change its consistency to a putty-like or flowable state. The intermediate layer forms an adherent bond with the other layers that resists separation even with flexing and temperature fluctuation. Materials which provide the desired heat softenable and pressure formable nature will be solid up to about 55°C. and will have a softening point within the temperature range 55°C. to 90°C., preferably within the range 60°C. to 80°C.

The annular sheet 12 thus comprises a flexible heat resistant base layer, a heat softenable intermediate layer and a conformable upper layer of magnetic powder oxide in a non-magnetic binder. This structure, allowing a 2 mil thickness for the intermediate layer and 0.9 mil thickness for the magnetic layer results in a total thickness of preferably not over 7 mils.

Materials having a softening point between 55°C. and 90°C. are found to have the proper balance of plasticity to permit them to be rapidly formed under heat and pressure into the desired shape and firmness to provide a useful sound disc. Exemplary materials having the desired softening point and adherent nature include polyester resins based upon polyethylene glycol isophthalate/terephthalate sold as "Dupont" adhesive No.

46,950 and "Goodyear" polyester K-59-2, polyethylene glycol terephthalate/sebacate sold as "Dupont" adhesive 46,960, polyethylene terephthalate sold as "Vitel" PE-207 and PE-209, polybisphenol A/ethylene glycol terephthalate, polybisphenol A-isophthalate/-terephthalate sold as "American Cyanamid" TP-300, and butadiene-styrene copolymer mixtures, e.g., a mixture of 62.5 parts "Pliolite" S5 and 37.5 parts "Pliolite" S7.

Materials having a softening point above the desired softening range may be made to be useful by incorporating therein a sufficient quantity of a suitable compatible plasticizer. The choice of plasticizer and the amount used will of course depend upon the particular material selected. For example, the aforementioned polyvinyl butyral can be sufficiently plasticized with about 10 percent by weight dioctyl phthalate to provide a useful material which will soften within the desired temperature range.

The magnetic layer 21 indicated as the front face layer contains a magnetically susceptible material such as magnetic acicular gamma-iron oxide ($Fe_2O_3$) which may be prepared by grinding the oxide to a suitable degree of fineness in a ball mill or other grinding device in a manner well known in the art, e.g., see U.S. Pat. No. 3,566,356.

The axial spacing for the tongues 36 and tabs 38 from the surface 35 is 0.045 inches to accommodate the material 12 and not pinch or bind it.

The transducer head is formed with a pole piece which will project from the head to be received in the spiral groove defined by the rib 53. The head will be biased against the oxide coated face of the material 12, urging the material against the surface 35 which is smooth and offers support for the material 12.

Having thus described the invention with reference to the preferred embodiment illustrated in the drawing it will be understood that changes and modifications may be made which come within the scope of the appended claims.

What is claimed is:

1. A transparency and rotatable sound track supporting assembly comprising a monolithic polymeric generally rectangular frame having a front and rear face, said frame being formed on said front face with an annular cavity defined by a generally planar surface, an inner cylindrical wall and an outer spaced concentric cylindrical wall projecting from said surface, said outer wall having radially inwardly projecting tabs projecting over a portion of the cavity and said inner circular wall having a pair of tongues projecting radially outward over a portion of said cavity, and said frame having a recess adjacent one edge and projecting into said planar surface and an opening therethrough with an area greater than a 35 millimeter image section disposed centrally of the frame and inner wall, the rear face of said frame having a pair of spaced parallel walls, said walls being positioned one on each diametrically opposite side of said opening through said frame and parallel to a side of the frame for supporting and positioning a transparency over said opening, and a thin flexible annular sheet of material having a central opening and a substantially circular continuous outer peripheral edge disposed in said annular cavity with a magnetizable coating on one face, said one face being exposed on said front face, a portion of the other face of said annular sheet of material being exposed at said recess, and said inner wall of said frame being disposed within said central opening of said annular sheet of material to position the sheet of material for rotation about said inner wall and between said planar surface on said frame and said tabs and tongues.

2. An assembly according to claim 1 wherein said annular sheet of material has a spiral rib formed on said one face defining a spiral sound track.

3. An assembly according to claim 1 wherein said annular sheet of material has thickness not greater than 7 mils.

4. An assembly according to claim 3, wherein said frame is formed with at least one additional recess in an edge thereof other than said one edge to accommodate a changer mechanism, said additional recess being positioned to not extend inwardly of said outer wall.

* * * * *